United States Patent [19]
Tang et al.

[11] Patent Number: 5,630,060
[45] Date of Patent: May 13, 1997

[54] METHOD AND APPARATUS FOR DELIVERING MULTI-MEDIA MESSAGES OVER DIFFERENT TRANSMISSION MEDIA

[75] Inventors: Hien Tang, Orange; Randy A. Cwikowski, Dana Point; Alistair Egan, Lake Forest, all of Calif.

[73] Assignee: Canon Kabushiki Kaisha, Tokyo, Japan

[21] Appl. No.: 432,534

[22] Filed: May 1, 1995

Related U.S. Application Data

[63] Continuation of Ser. No. 5,768, Jan. 13, 1993, abandoned.
[51] Int. Cl.$^6$ .............................. G06F 13/00; H04M 3/50
[52] U.S. Cl. ................ 395/200.01; 395/500; 379/89
[58] Field of Search ........................ 395/200.01, 200.02, 395/500, 650; 379/88, 89, 90

[56] References Cited

U.S. PATENT DOCUMENTS

| | | | |
|---|---|---|---|
| 4,918,322 | 4/1990 | Winter et al. | 379/88 |
| 4,931,950 | 6/1990 | Isle et al. | 364/513 |
| 4,955,019 | 9/1990 | Mizuhara et al. | 370/85.7 |
| 4,972,462 | 11/1990 | Shibata | 379/89 |
| 4,991,200 | 2/1991 | Lin | 379/100 |
| 5,008,926 | 4/1991 | Misholi | 379/89 |
| 5,029,199 | 7/1991 | Jones et al. | 379/89 |
| 5,208,850 | 5/1993 | Kino | 379/88 |
| 5,218,458 | 6/1993 | Koclins et al. | 358/448 |
| 5,263,082 | 11/1993 | Kotake et al. | 379/93 |
| 5,283,819 | 2/1994 | Glick et al. | 379/90 |
| 5,301,191 | 4/1994 | Otani | 370/84 |
| 5,333,266 | 7/1994 | Boaz et al. | 395/200.01 |
| 5,487,100 | 1/1996 | Kane | 379/57 |

FOREIGN PATENT DOCUMENTS

| | | |
|---|---|---|
| 1-101757 | 8/1989 | Japan . |
| 1-194649 | 11/1989 | Japan . |
| 2-222356 | 11/1990 | Japan . |
| 3-195153 | 11/1991 | Japan . |

OTHER PUBLICATIONS

"Speech-to-Image Media Conversion . . ." Harashima et al IEEE Journal, Jul. 1991 p. 2865–2868.

"A Low Cost Multi Media Radio System" by Merrill et al IEEE Journal Sep. 1991 pp. 961–965.

*Primary Examiner*—Parshotam S. Lall
*Assistant Examiner*—Viet Vu
*Attorney, Agent, or Firm*—Fitzpatrick, Cella, Harper & Scinto

[57] ABSTRACT

Method and apparatus for delivering multi-media messages which may include text components, image components, sound components or binary components to multiple recipients over different transmission media. A list of recipients of the multi-media message is inspected to determine all of the different transmission media that will be needed to transmit to all the recipients. The list of recipients may be obtained from an address portion of the multi-media message, and may, for example, consist of the direct recipients of a message, the carbon copy ("cc:") recipients of the message, and the blind carbon copy ("bcc:") recipients of the message. It is possible for each recipient to receive various components of the multi-media message by different media. Then, for each component of the message that is incompatible with all needed transmission media, the component is converted into equivalent components whose types are compatible with all the different transmission media. Thus, for example, if a multi-media message includes a text component, then an equivalent image component is created for the facsimile medium by conversion of the text file to an image file, and equivalent audio component is created for the voice telephone medium by conversion of the text file into an audio file via text-to-speech technology. A message delivery schedule is then formed, which lists, for each recipient, the medium to be used and the message component (original component or equivalent component) to be delivered. The messages are then delivered according to the delivery schedule.

32 Claims, 4 Drawing Sheets

METHOD AND APPARATUS FOR DELIVERING MULTI-MEDIA MESSAGES OVER DIFFERENT TRANSMISSION MEDIA

This application is a continuation, of application Ser. No. 08/005,768 filed Jan. 13, 1993, now abandoned.

BACKGROUND OF THE INVENTION

1. Field Of The Invention

The present invention relates to a method and apparatus for delivering multi-media messages, which may have image, audio, text and other types of information mixed in a single message, over different transmission media. In particular, the invention relates to method and apparatus for comparing the components of a multi-media message to specified transmission media to determine whether the components are compatible with the specified media, forming equivalent components where the original components are incompatible to the selected transmission media, and for electronically delivering the messages using the original component or the original components as appropriate to the specified transmission media.

2. Description of the Related Art

Recently, equipment has been proposed that processes and edits multi-media messages, that is, messages containing image components, audio components, text components and components of other types of information mixed in a single message. For example, U.S. application Ser. No. 07/808,757, filed Dec. 17, 1991, describes a method and apparatus for creating, editing and displaying such multi-media messages in a multi-media environment, and for electronically sending and receiving such messages via different transmission media including facsimile, voice telephone and modem. The contents of Ser. No. 07/808,757 are incorporated herein by reference as if set forth in full below.

Delivery of such messages to different recipients, however, creates difficulties. It may be desired, for example, to deliver multi-media messages to a recipient who only has facsimile capabilities. In this situation, the above-referenced Ser. No. 07/808,757 describes a conversion technique for converting the components in the multi-media message into a format for the specified delivery medium.

SUMMARY OF THE INVENTION

The present invention expands on those techniques and provides method and apparatus for delivering multi-media messages which may include text components, image components, sound components or binary components to multiple recipients over different transmission media. The invention further provides capability to deliver the components of a multi-media message to a single recipient using different transmission media.

According to the invention, a list of recipients of the multi-media message is inspected to determine all of the different transmission media that will be needed to transmit to all the recipients. The list of recipients may be obtained from an address portion of the multi-media message, and may, for example, consist of the direct recipients of a message, the carbon copy ("cc:") recipients of the message, and the blind carbon copy ("bcc:") recipients of the message. If, for example, a first recipient is to receive the multi-media message by facsimile medium and a second recipient is to receive the multi-media message by voice telephone medium, then the list of all needed media is facsimile and voice telephone. It is possible for each recipient to receive various components of the multi-media message by different media, in which case each component in the list of recipients is inspected to determine all of the different transmission media that are needed. Then, for each component of the message that is incompatible with all needed transmission media, the component is converted into equivalent components whose types are compatible with all the different transmission media. Thus, for example, if a multi-media message includes a text component, then an equivalent image component is created for the facsimile medium by conversion of the text file to an image file, and equivalent audio component is created for the voice telephone medium by conversion of the text file into an audio file via text-to-speech technology. A message delivery schedule is then formed, which lists, for each recipient, the medium to be used and the message component (original component or equivalent component) to be delivered. The messages are then delivered according to the delivery schedule.

This brief summary has been provided so that the nature of the invention may be understood quickly. A more complete understanding of the invention can be obtained by reference to the following detailed description of the preferred embodiment thereof in connection with the drawings which together form a complete part of the specification.

DETAILED DESCRIPTION OF THE PREFERRED EMBODIMENT

Figure 1:
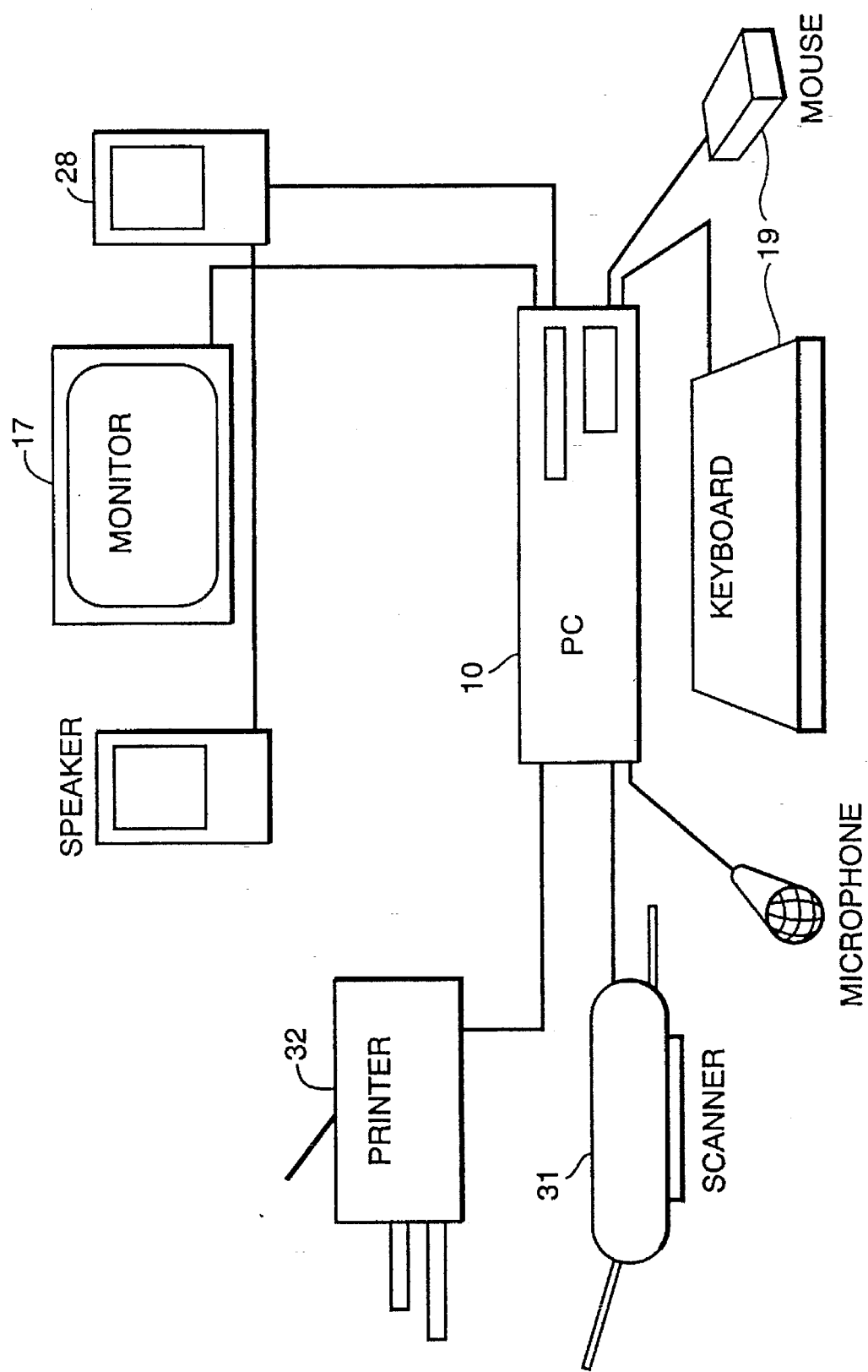
FIG. 1 is a perspective view of the outward appearance of an apparatus according to the invention.
Figure 2:
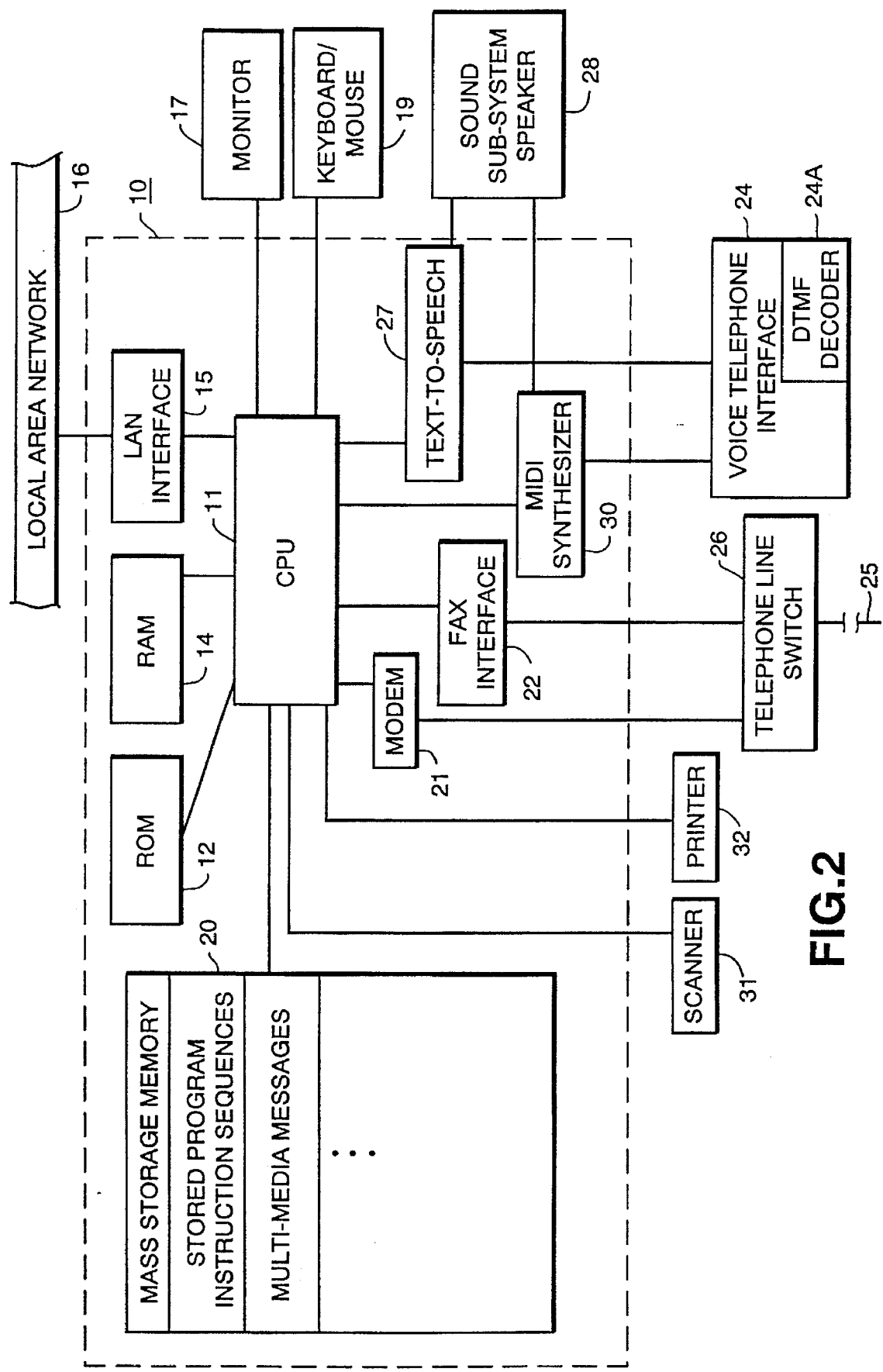
FIG. 2 is a block diagram of the FIG. 1 apparatus.

FIGS. 1 and 2 show an apparatus according to the present invention. As shown in these Figures, reference numeral 10 designates personal computing equipment such as an IBM PC or PC-compatible computer. While it is preferred to implement in the invention such personal computing equipment, it is to be understood that the invention may be incorporated into dedicated and/or stand-alone computing equipment.

Computing equipment 10 includes a CPU 11 such as an 80386 processor which executes stored program instructions such as operator selected applications programs that are stored in RAM 12 or specialized functions such as start-up programs or BIOS which are stored in ROM 14. Computing equipment 10 further includes a local area network interface 15 which provides interface to a local area network 16 whereby the computing equipment 10 can access files such as multi-media message files on a remote file server or send files for remote printing or otherwise interact with a local area network in accordance with known techniques such as by file exchange or by sending or receiving electronic mail. Computing equipment 10 further includes a monitor 17 for displaying graphic images and a keyboard/mouse 19 for allowing operator designation of areas on monitor 17 and inputting information.

Mass storage memory 20, such as a fixed disk or a floppy disk drive, is connected for access by CPU 11. Mass storage 20 typically includes stored program instruction sequences such as an instruction sequence according to the invention, for creating, editing and displaying multi-media messages in a multi-media environment and for sending and receiving multi-media messages via different transmission media including facsimile, voice telephone and modem, as well as other stored program instruction sequences for executing application programs such as word processing application programs, optical character recognition programs, block selection applications programs, spreadsheet application programs, and other information and data processing programs. Mass storage memory 20 further includes multi-media messages stored as described below in connection with FIG. 3. Other data may be stored on mass storage memory 20 as desired by the operator.

A modem 21, a facsimile interface 22, and a voice telephone interface 24 are provided so that CPU can interface to an ordinary telephone line 25. Each of the modem 21, facsimile interface 22, and voice telephone interface 24 are given access to the telephone line 25 via a telephone line switch 26 which is activated under control by CPU 11 so as to connect telephone line 25 to one of the modem 21, the facsimile 22, or the voice telephone interface 24, as appropriate to the data being sent and received on the telephone line. Thus, CPU 11 can send and receive binary data such as ASCII text files or document images files via modem 21, it can send and receive facsimile messages via facsimile interface 22, and it can interact on an ordinary voice telephone line via voice telephone interface 24. In this regard, voice telephone interface 24 is provided with a DTMF decoder 24a so as to decode tones on the voice telephone line 25 which correspond to operator depressions of a telephone keypad. In accordance with stored program instruction sequences in mass storage memory 20, the decoded tones are interpreted by CPU 11 into operator commands, and those operator commands are executed so as to take predesignated actions in accordance with operator depressions of the telephone keypad.

A conventional text-to-speech convertor 27 is connector to the CPU 11. The text-to-speech convertor 27 interprets text strings that are sent to it and converts those text strings to audio speech information. The text-to-speech convertor 27 provides audio speech information either to a speaker 27 for enunciation to a local computer operator, or provides audio speech information to the voice telephone interface 24 for enunciation over ordinary voice telephone lines.

MIDI ("Musical Instrument Digital Interface") synthesizer 30 is also connected to CPU 11 and interprets MIDI music commands from CPU 11 so as to convert those MIDI music commands to audio wave forms. The audio wave forms are, in turn, played out over speaker 28 or provided to voice telephone interface 24 for play out over ordinary voice telephone lines.

Scanner 31 operates to scan original documents printed on a sheet of paper, and to convert the information of those original documents into a bit-by-bit computer readable representation of that document. Scanner 31 may be a simple black and white scanner, but more preferably scanner 31 includes at least half-tone (grey scale) processing capabilities and/or color processing capabilities.

Printer 32 is provided to form images of documents under the control of CPU 11. Printer 32 may be an ordinary black and white printer, but, more preferably, printer 32 includes half-tone and/or color capabilities.

Figure 3:
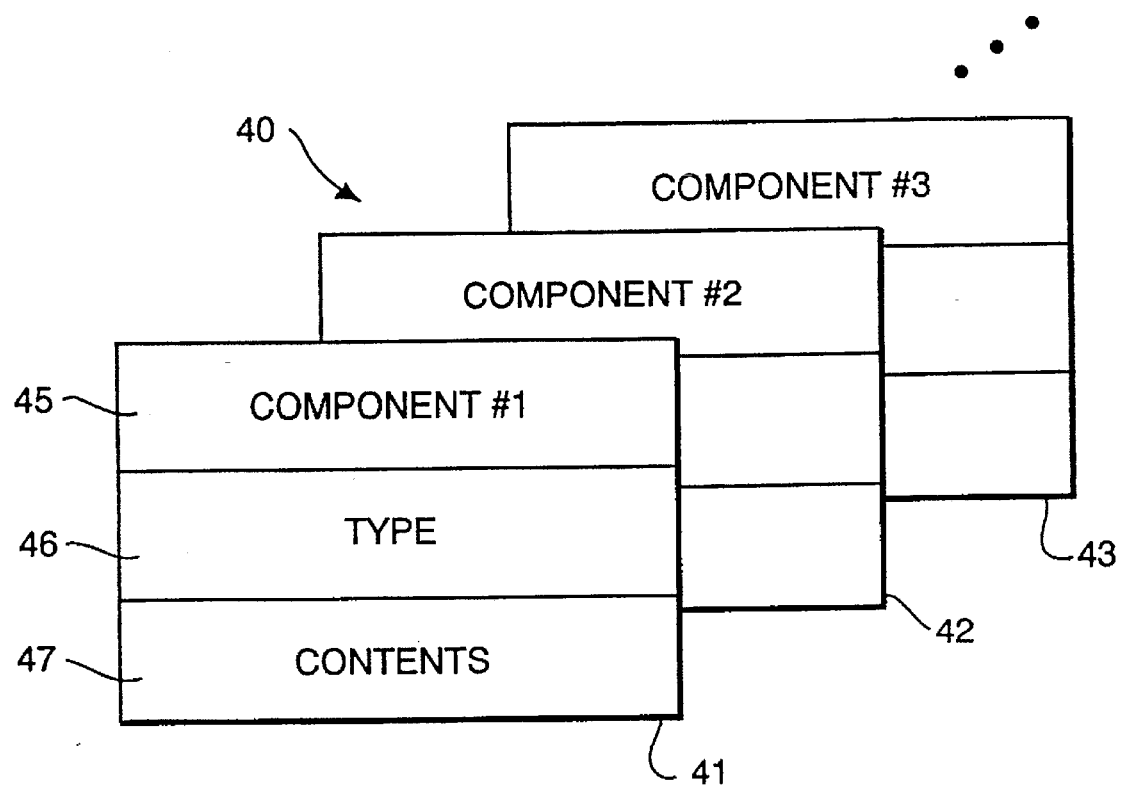
FIG. 3 is a representational view illustrating storage of the components of a multi-media message.

FIG. 3 is a representational view of how multi-media messages are stored. FIG. 3 shows a single multi-media message 40 and as seen there, each multi-media message includes plural components 41, 42 and 43. Each component includes a component identification area 45, a component type 46 and component contents 47. The component type may be any of a variety of data types such as a text-type component, an image-type component, an audio-type component such as a PCM (pulse code modulated) voice file, a binary-type component such as an executable file or a spreadsheet analysis, and so on. Other types of components are possible, such as object linking and embedded ("OLE") links.

In accordance with the techniques described in the aforementioned Ser. No. 07/808,757, multi-media messages such as those shown in FIG. 3 may be created, displayed and edited on computing equipment 10, and may be sent and received electronically via different transmission media including facsimile interface 22, modem 21 and voice telephone interface 24.

Figure 4:
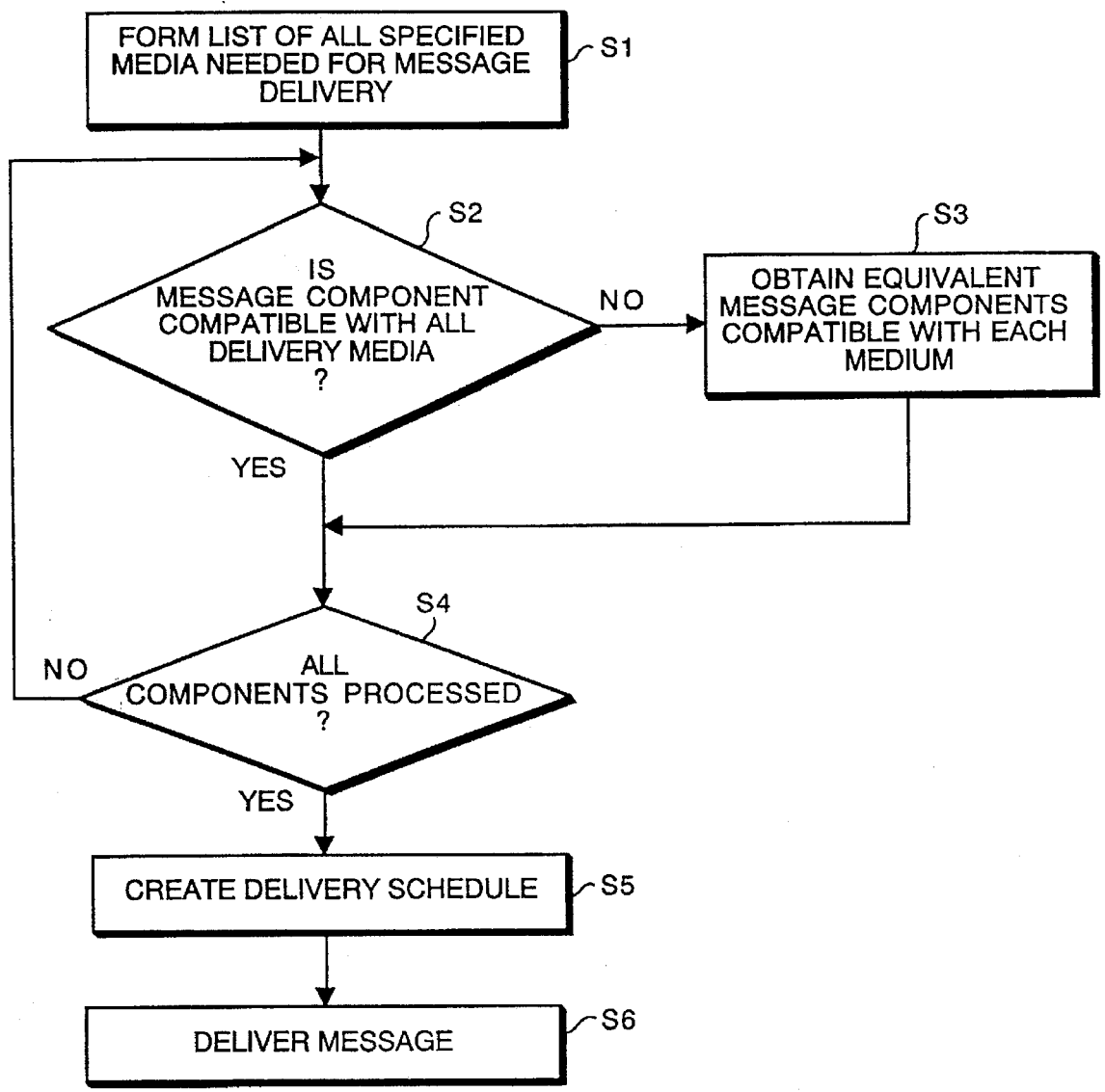
FIG. 4 is a flow diagram for explaining multi-media message delivery processing according to the invention.

FIG. 4 is a detailed flow diagram showing the multi-media message delivery according to the invention. The process steps shown in FIG. 4 are executed by CPU 11 in accordance with program instruction sequences stored in mass storage 20 and executed out of RAM 14.

In step S1, CPU 11 forms a list of all specified transmission media needed for message delivery. More specifically, when multi-media messages are to be delivered, the operator specifies the recipients of the message, as well as the preferred media for each recipient and for each component of the message. In this example, the multi-media message contains four components. In step S1, CPU 11 determines all the transmission media that have been specified. Thus, for example, assume that the operator has specified the media delivery addresses set forth in following Table I:

TABLE I

Media Delivery Addresses

| | Media Delivery Information | | | |
|---|---|---|---|---|
| Recipient | Component #1 | Component #2 | Component #3 | Component #4 |
| A. Brown | facsimile | facsimile | voice telephone | voice telephone |
| C. Daniels | voice telephone | voice telephone | modem | voice telephone |
| E. Frank | modem | modem | voice telephone | modem |

In step S1, CPU 11 sequences through the media delivery information and forms a list of all the media that have been specified. In consideration of Table I given above, CPU 11 will form a list including the following media: (a) facsimile, (b) voice telephone, and (c) modem. Thus, the media list resulting from the above Table I includes all the transmission media that have been provided for computing equipment 10. Different arrangements of media delivery addresses will, of course, yield different media lists. For example, if the above Table I does not include the media delivery information for Mr. Brown, then the media list would include only the voice telephone and the modem media.

It is to be noted that the above media delivery information allowed the operator to specify different media for the different components of the message. While it is preferred to provide the operator with this flexibility, in certain circumstances this flexibility need not be provided.

In step S2, CPU 11 determines whether each message component is compatible with all the delivery media listed in the media list. If any message component is incompatible with a delivery media, then flow advances to step S3 in which CPU 11 obtains an equivalent message component that is compatible with the medium; processing proceeds in accordance with steps S2 and S3 until all components of the multi-media message have been compared to all delivery media (step S4).

In more detail, in step S2, CPU 11 determines whether the delivery media is compatible with the message component type in accordance with the following Table II:

TABLE II

Compatibility Table

| Delivery Media | Compatible Message Component Type | | | |
|---|---|---|---|---|
| | Text | Image | Sound | Binary |
| Voice Telephone | No | No | Yes | No |
| Facsimile | No | Yes | No | No |
| Modem (or LAN) | Yes | Yes | Yes | Yes |

If the message component is compatible with the delivery medium, then processing advances to step S4 to determine whether all components have been processed. On the other hand, if the message component is not compatible with all delivery media, then an equivalent message component which is compatible with each medium is obtained by reference to the following conversion Table III:

TABLE III

Conversion Table

| | OUTPUT | | | |
|---|---|---|---|---|
| | Text | Image | Sound | Binary |
| INPUT | | | | |
| Text | Yes | Yes | Yes (speech synthesis) | Yes |
| Image | Yes (OCR) | Yes | Yes (OCR plus speech synthesis) | Yes |
| Sound | No | No | Yes | No |
| Binary | No | No | No | Yes |

It is to be noted that conversion Table III is specified in accordance with existing conversion technology. Thus, for example, it is currently possible to convert an image component which includes images of text into an equivalent text component using optical character recognition technology, and further to convert such a text file into a sound file using speech synthesis technology. Current conversion techniques do not permit, for example, conversion of sound files into text files. Research is currently underway into such conversions, and it may become possible to convert sound files that include spoken words into equivalent text files as those conversion technologies become more widely available, conversion Table III may be updated appropriately.

The following Table IV illustrates processing in accordance with steps S2 through S4 whereby for each component of the multi-media message whose type is incompatible with the delivery medium, an equivalent component whose type is compatible is obtained. In Table IV, the above-mentioned four-component multi-media message is assumed to have the following component break down:

Component #1-text
Component #2-image
Component #3-sound
Component #4-binary (It will be recalled that the media delivery list includes all three media, namely, facsimile, voice telephone, and modem.)

In step S2, CPU 11 compares text-type component #1 with the facsimile media in accordance with compatibility Table III and determines that a text-type component is incompatible with facsimile delivery medium. Accordingly, flow advances to step S3 in which CPU 11 converts the text-type component into an equivalent image-type component. Likewise, CPU 11 compares image-type component #2 with the facsimile medium and finds that the types are compatible; accordingly, no conversion is needed. CPU 11 continues processing sound-type component #3, determines that sound is incompatible with facsimile medium, and attempts a conversion. However, as seen in conversion Table III, it is not now possible to convert a sound-type component into an equivalent component that is compatible with facsimile transmission (i.e., image-type); accordingly, CPU 11 generates an "unconvertible" icon of the appropriate type (here, image) so that there is some indication to the recipient of the message that part of the message has not been transmitted.

Flow proceeds as indicated above until all message components have been compared to all media in the list of needed transmission media, whereafter CPU 11 creates the following Table IV of equivalent components:

TABLE IV

Equivalent Component Table

| | Compatible Objects | | |
|---|---|---|---|
| Component | Voice Telephone | Facsimile | Modem |
| 1 | Audio Equivalent | Image Equivalent | Original Component |
| 2 | "Unconvertible" Icon | Original Component | Original Component |
| 3 | Original Component | "Unconvertible" Icon | Original Component |
| 4 | "Unconvertible" Icon | "Unconvertible" Icon | Original Component |

It is to be noted that equivalent components are created for all message components and for all transmission media in the media list, regardless of whether those components are actually needed to deliver the multi-media message. Thus, for example, even though there is no need for a facsimile-compatible component for sound-type component #3 and binary-type component #4, CPU 11 derives equivalent components, here, "unconvertible" icons.

Reverting to FIG. IV, after all components have been compared against all delivery media, flow advances to step S5 in which CPU 11 creates a delivery schedule. The delivery schedule provides CPU 11 with the specific components that will be delivered to each recipient, namely the original component or an equivalent component that is compatible with the selected transmission media. CPU 11 creates the delivery schedule by combining the media delivery addresses (for example, Table I) with the equivalent component table, (for example, Table IV). For example, for text-type component #1, which is specified to be delivered to Mr. Brown by facsimile medium (see Table I), CPU 11 selects the image equivalent of component #1 (see Table IV). CPU 11 continues processing all message components for all recipients until a full delivery schedule has been derived, as shown, for example, in the following Table V:

TABLE V

Delivery Schedule

| Recipient | Component #1 | Component #2 | Component #3 | Component #4 |
|---|---|---|---|---|
| A. Brown | Image Equivalent | Original | Original | "Unconvertible" Icon |
| C. Daniels | Audio Equivalent | "Unconvertible" Icon | Original | "Unconvertible" Icon |
| E. Frank | Original | Original | Original | Original |

Flow then advances to step S6 in which CPU 11 delivers the multi-media message to the selected recipients in accordance with the delivery schedule. Thus, for example, Mr. Brown receives an image equivalent of text-type component #1, via facsimile, the original image-type component #2 via facsimile, the original sound-type component #3 via voice telephone, and an "unconvertible" sound-type icon in place of binary-type component #4 via voice telephone.

What is claimed is:

1. A method for delivering a multi-media message to a remote site over a sender-specified one of plural different transmission media, the plural different transmission media including at least a voice telephone transmission medium, a facsimile transmission medium and a modem transmission medium, the multi-media message having plural components of differing types, the method comprising the steps of:

allowing a sender to specify a delivery medium for delivering the components of the multi-media message to the remote site;

obtaining, for each component of the multi-media message whose type is incompatible with said sender-specified delivery medium, an equivalent component whose type is compatible;

forming a delivery schedule for delivering the multi-media message, the delivery schedule selectively scheduling an original multi-media component or its equivalent component in accordance with which is compatible with said sender-specified delivery medium; and delivering the multi-media message to the remote site in accordance with the delivery schedule.

2. A method according to claim 1, wherein plural delivery addresses are provided for said multi-media message, and wherein said specifying step includes the step of inspecting each delivery address and forming a list of all media which are needed to deliver the multi-media message.

3. A method according to claim 2, wherein different components of said multi-media message may be delivered to a single recipient via different media.

4. A method according to claim 1, wherein said obtaining step comprises the steps of comparing each component of said multi-media message with said sender-specified delivery medium to determine whether each component is compatible with said sender-specified delivery medium, and converting the component into an equivalent component in the case where the component is incompatible with said sender-specified delivery medium.

5. A method according to claim 4, wherein said converting step includes the step of providing an unconvertible signal in the case where conversion of the component to a compatible type is not possible.

6. A method according to claim 1, wherein said forming step includes the steps of forming a delivery schedule by selecting for delivery the original component in the case where said delivery medium is compatible with the type of original component, and selecting an equivalent component of a type compatible with said delivery medium in the case where the type of the original component is incompatible with said delivery medium.

7. A method according to claim 1, wherein said delivering step includes the step of delivering image-type components via a facsimile medium, delivering sound-type components via a voice telephone medium, and delivering text-type components via a modem medium.

8. Apparatus for delivering a multi-media message to a remote site over a sender-specified one of different transmission media, the multi-media message having plural components of differing types, said apparatus interfacing to a voice telephone transmission medium, a facsimile transmission medium, and a modem transmission medium, said apparatus comprising:

a memory having a first section for storing the multi-media message and having a second section for storing process steps; and a processor for executing the process steps stored in the second section of said memory;

wherein said process steps include process steps to (a) allow a sender to specify a delivery medium for delivering the components of the multi-media message, to the remote site, (b) obtain, for each component of the multi-media message whose type is incompatible with the said sender-specified delivery medium, an equivalent component whose type is compatible, (c) form a delivery schedule which selectively schedules an original multi-media component or its equivalent component in accordance with which is compatible with said sender-specified delivery medium, and (d) deliver the multi-media message to the remote site in accordance with the delivery schedule.

9. An apparatus according to claim 8, wherein plural delivery addresses are stored for said multi-media message, and wherein said process steps include steps to inspect each delivery address and to form a list of all media which are needed to deliver the multi-media message.

10. An apparatus according to claim 9, wherein different components of said multi-media message may be delivered to a single recipient via different media.

11. An apparatus according to claim 8, wherein said process steps include steps to compare each component of said multi-media message with said delivery medium to determine whether each component is compatible with the delivery medium, and to convert the component into an equivalent component in the case where the component is incompatible with said delivery medium.

12. An apparatus according to claim 11, wherein said process steps include steps to provide an unconvertible signal in the case where conversion of the component to a compatible type is not possible.

13. An apparatus according to claim 8, wherein said process steps include steps to form a delivery schedule by selecting for delivery the original multi-media component in the case where said delivery medium is compatible with the type of original component, and by selecting an equivalent component of a type compatible with said delivery medium in the case where the type of the original component is incompatible with said delivery medium.

14. An apparatus according to claim 8, wherein said process steps include steps to deliver image-type components via said facsimile transmission medium, to deliver sound-type components via said voice telephone transmission medium, and to deliver text-type components via said modem transmission medium.

15. A method for delivering a multi-media message to a remote site over a sender-specified one of plural different delivery media, the multi-media message having plural components including an image-type component deliverable via a facsimile delivery medium and a sound-type component deliverable over a voice telephone delivery medium and a text-type component deliverable over a modem delivery medium, the method comprising the steps of:

allowing a sender to specify a delivery medium for delivering the plural components of the multi-media message;

retrieving each of the plural components of the multi-media message;

determining, for each of the plural components of the multi-media message, whether the component is of a type which is compatible with the sender-specified delivery medium;

obtaining, for each component of the multi-media message which was determined in said determining step to be incompatible with the sender-specified delivery medium, an equivalent component whose type is compatible with the sender-specified delivery medium;

forming a delivery schedule for delivering the multi-media message, the delivery schedule selectively scheduling an original multi-media message component or its equivalent component in accordance with compatibility with the sender-specified delivery medium;

establishing remote communication over the sender-specified delivery medium; and delivering the multi-media message in accordance with the delivery schedule.

16. A method according to claim 15, wherein plural delivery addresses are provided for said multi-media message, and wherein said specifying step includes the step of inspecting each delivery address and forming a list of all media which are needed to deliver the multi-media message.

17. A method according to claim 16, wherein different components of said multi-media message may be delivered to a single recipient via different media.

18. A method according to claim 15, wherein said obtaining step comprises the steps of comparing each of the plural components of said multi-media message with the sender-specified delivery medium to determine whether each component is compatible with the sender-specified delivery medium, and converting a component into an equivalent component in the case where a component is incompatible with the sender-specified delivery medium.

19. A method according to claim 15, wherein said converting step includes the step of providing an unconvertible signal, which is delivered with the multimedia message, in a case where conversion of the component to a compatible type is not possible.

20. A method according to claim 15, wherein said forming step includes the steps of forming a delivery schedule by selecting for delivery the original multi-media message component in a case where the sender-specified delivery medium is compatible with the type of original component, and selecting an equivalent component of a type compatible with the sender-specified delivery medium in a case where the type of the original component is incompatible with the sender-specified delivery medium.

21. A method according to claim 15, wherein said delivery step includes the step of delivering image-type components via a facsimile delivery medium, delivering sound-type components via a voice telephone delivery medium, and delivering text-type components via a modem delivery medium.

22. Apparatus for delivering a multi-media message to a remote site over a sender-specified one of plural different delivery media, the multi-media message having plural components including an image-type component deliverable via a facsimile delivery medium and a sound-type component deliverable over a voice telephone delivery medium and a text-type component deliverable over a modem delivery medium, said apparatus comprising:

an interface to a voice telephone delivery medium;

an interface to a facsimile delivery medium;

an interface to a modem delivery medium;

a memory having a first section for storing the multi-media message and having a second section for storing process steps; and a processor for executing the process steps stored in the second section of said memory;

wherein said process steps include process steps to (a) allow a sender to specify a delivery medium for delivering the plural components of the multi-media message, (b) retrieve each of the plural components of the multi-media message, (c) determine, for each of the plural components of the multi-media message, whether the component is of a type compatible with the sender-specified delivery medium, (d) obtain, for each of the plural components of the multi-media message whose type is incompatible with the sender-specified delivery medium, an equivalent component whose type is compatible with the sender-specified delivery medium, (e) form a delivery schedule which selectively schedules an original multi-media message component or its equivalent component in accordance with which is compatible with the sender-specified delivery medium, (f) establish remote communication over the sender-specified delivery medium, and (g) deliver the multi-media message in accordance with the delivery schedule.

23. An apparatus according to claim 22, wherein plural delivery addresses are provided for said multi-media message, and wherein said process steps include steps to inspect each delivery address and to form a list of all media which are needed to deliver the multi-media message.

24. An apparatus according to claim 23, wherein different components of said multi-media message may be delivered to a single recipient via different media.

25. An apparatus according to claim 22, wherein said process steps include steps to compare each of the plural components of said multi-media message with the sender-specified delivery medium to determine whether each component is compatible with the sender-specified delivery medium, and to convert a component into an equivalent component in a case where the component is incompatible with the sender-specified delivery medium.

26. An apparatus according to claim 22, wherein said process steps include steps to provide an unconvertible signal, which is delivered with the multi-media message, in a case where conversion of the component to a compatible type is not possible.

27. An apparatus according to claim 22, wherein said process steps include steps to provide a delivery schedule by selecting for delivery the original multi-media message component in a case where the sender-specified delivery medium is compatible with the type of original component, and by selecting an equivalent component of a type compatible with the sender-specified delivery medium in a case where the type of the original component is incompatible with the specified delivery medium.

28. An apparatus according to claim 22, wherein said process steps include steps to deliver image-type components via said facsimile delivery medium, to deliver sound-type components via said voice telephone delivery medium, and to deliver text-type components via said modem delivery medium.

29. A method according to claim 2, wherein in said obtaining step, equivalent components, whose types are compatible with all media in the list of media needed to deliver said multi-media message, are obtained for each and every component in said multi-media message.

30. An apparatus according to claim 9, wherein said process steps include steps to obtain equivalent components, whose types are compatible with all media in the list of media needed to deliver said multi-media message, for each and every component in said multi-media message.

31. A method according to claim 15, wherein in said obtaining step, equivalent components, whose types are compatible with all media in the list of media needed to deliver said multi-media message, are obtained for each and every component in said multi-media message.

32. An apparatus according to claim 22, wherein said process steps include steps to obtain equivalent components, whose types are compatible with all media in the list of media needed to deliver said multi-media message, for each and every component in said multi-media message.

* * * * *